United States Patent
Fantana et al.

(10) Patent No.: US 7,239,977 B2
(45) Date of Patent: Jul. 3, 2007

(54) METHOD AND SYSTEM FOR SYSTEMATIC EVALUATION OF EVALUATION PARAMETERS OF TECHNICAL OPERATIONAL EQUIPMENT

(75) Inventors: Nicolaie Laurentiu Fantana, Heidelberg (DE); Lars Pettersson, Ludvika (SE); Mark D. Perkins, St. Charles, MO (US); Ramsis S. Girgis, Wildwood, MO (US); Asim Fazlagic, St. Louis, MO (US)

(73) Assignee: ABB Patent GmbH, Ladenburg (DE)

( * ) Notice: Subject to any disclaimer, the term of this patent is extended or adjusted under 35 U.S.C. 154(b) by 0 days.

(21) Appl. No.: 10/547,478

(22) PCT Filed: Apr. 6, 2004

(86) PCT No.: PCT/EP2004/003635

§ 371 (c)(1),
(2), (4) Date: May 26, 2006

(87) PCT Pub. No.: WO2004/090764

PCT Pub. Date: Oct. 21, 2004

(65) Prior Publication Data

US 2006/0259277 A1 Nov. 16, 2006

Related U.S. Application Data

(60) Provisional application No. 60/497,891, filed on Aug. 25, 2003.

(30) Foreign Application Priority Data

Apr. 9, 2003 (DE) ................ 103 16 424

(51) Int. Cl.
*G06F 15/00* (2006.01)

(52) U.S. Cl. ............ 702/185; 702/182; 702/183; 702/184; 702/186; 702/189; 700/26; 700/28; 700/51

(58) Field of Classification Search ............. 702/185, 702/182–184, 186, 189; 700/28–30, 51, 700/26; 714/47
See application file for complete search history.

(56) References Cited

U.S. PATENT DOCUMENTS

| 5,838,881 A | 11/1998 | Nelson et al. |
| 2002/0116157 A1 | 8/2002 | Markle et al. |
| 2003/0204788 A1* | 10/2003 | Smith ................ 714/47 |
| 2004/0204775 A1* | 10/2004 | Keyes et al. ........... 700/29 |

FOREIGN PATENT DOCUMENTS

WO 02/10919 A2 2/2002

OTHER PUBLICATIONS

Nicolaie L. Fantana et al., "Zustandsabhaengige Bewetung", Lifetime Management, ABB Technik, Apr. 2000, pp. 45-54, XP-002291253 (cited in the attached International Search Report dated Aug. 26, 2004).
Bimal K Bose, "Fuzzy Logic and Neural Networks", IEEE Industry Applications Magazine, May/Jun. 2000, pp. 57-63, XP-001034514, IEEE Center U.S. (cited in the attached International Search Report dated Aug. 26, 2004).

* cited by examiner

*Primary Examiner*—Marc S. Hoff
*Assistant Examiner*—Phuong Huynh
(74) *Attorney, Agent, or Firm*—Buchanan Ingersoll & Rooney PC

(57) ABSTRACT

A method and system for the systematic evaluation and rating of technical equipment using a data processing device (20), which works together with at least one data memory (21) and has an input (22) and display device (23), in which, step-by-step for the particular technical equipment, at least one first data set having economically relevant input parameters and at least one second data set having technically relevant input parameters are detected and/or established.

Figure 1:
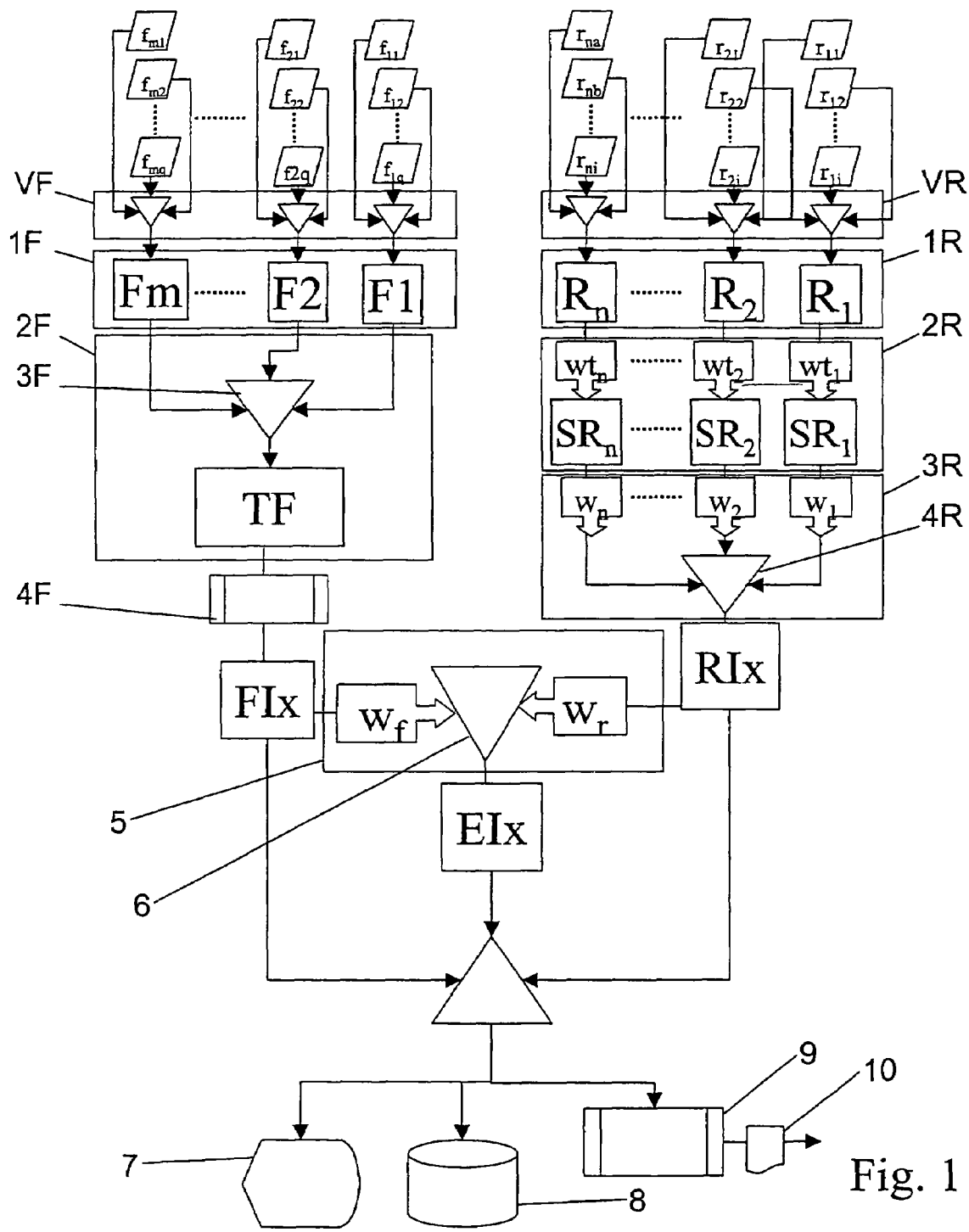

For each data set, through knowledge-based predetermined numerical and/or logical linkages and knowledge-based predetermined weighting factors specific to the equipment, the established input parameters are brought together into an economic evaluation parameter FIx and a technical evaluation parameter RIx, respectively, and from the established evaluation parameters, through knowledge-based predetermined numerical linkages and weighting factors, a single overall resulting evaluation parameter EIx is determined.

27 Claims, 10 Drawing Sheets

METHOD AND SYSTEM FOR SYSTEMATIC EVALUATION OF EVALUATION PARAMETERS OF TECHNICAL OPERATIONAL EQUIPMENT

RELATED APPLICATIONS

This application claims priorities under 35 U.S.C. §119 to German Application No. 103 16 424.3, filed Apr. 9, 2003 and U.S. application Ser. No. 60/497,891, filed Aug. 25, 2003, and Under 35 U.S.C. Application No. PCT/EP2004/003635, filed as an International Application on Apr. 6, 2004, designated the U.S., the entire contents of which are hereby incorporated by reference in their entireties.

The present invention relates to a method and a system for systematic evaluation and rating of technical equipment, particularly power engineering equipment, using demand-oriented data detection, which is specifically tailored to the particular equipment or the particular type of equipment, and/or a specific evaluation structure or a specific evaluation scheme.

As is known from the article "Zustandsabhängige Bewertung-Neuer Ansatz zum Lebensdauermanagement für elektrische Betriebsmittel [Status-Dependent Evaluation—Novel Approach for Service Life Management for Electrical Equipment]", published in the ABB Technik April 2000 Journal, in practical application, two types of evaluation methods are primarily used for technical equipment, specifically: statistical methods and methods oriented individually to the individual equipment. The statistical methods require reliable data, which may be statistically evaluated, in a sufficient quantity. For this purpose, the technical equipment observed is to have a comparable structure and its breakdown mechanism is to be simple and well known. More complex equipment, such as power transformers, typically do not fulfill the above-mentioned requirement. Rather, in this case each unit is typically a unique item.

In contrast, statistical methods require larger "populations", typically having equipment whose technical functional and structure are comparable. Such methods are accordingly not suitable or are suitable in only a limited way for evaluating a single power transformer, for example. To achieve set strategic and operational goals, it is necessary to recognize the asset components and/or technical equipment which are most susceptible and to determine and/or select the particular optimal methods for replacement, maintenance, and/or operation of any of the equipment. For this purpose, an individual approach, such as an evaluation method based on weighting factors or a modern evaluation method, is to be used. Methods based on weighting factors may be used in the first phase of an equipment evaluation. They are typically simple and rapid, but also subjective in regard to judgment, input data, and weighting factors. The results therefore provide only a restricted physical and/or functional insight into a component of the equipment observed and may lead to mixing of different stresses and risks. Modern evaluation methods may provide more objective information to support decisions about the unit observed, but they require knowledge of the history of the particular equipment and/or the particular unit, which is often known only in a restricted way.

The structure of a corresponding typical evaluation scheme is flat, i.e., the particular output variable is determined directly starting from an array of inputs and/or input variables without hierarchical configuration.

The present invention is based on the object of allowing a systematic evaluation and rating of equipment in the simplest possible way with the least possible outlay and avoiding the above-mentioned disadvantages.

The above-mentioned object is achieved by a method of the type cited at the beginning having the features of claim 1. Further advantageous embodiments of the method according to the present invention and a system for its execution are specified in the subclaims and the following description.

The method for systematic evaluation and rating of technical equipment, particularly power engineering equipment, allows, using demand-oriented data detection tailored to the particular equipment or the particular type of equipment and/or a specific evaluation structure or a specific evaluation scheme, determination of evaluation parameters, particularly the technical evaluation parameter RIx, relating to the technical status of the particular equipment, and the economic evaluation parameter FIx, relating to the economic significance of the particular technical equipment, and their facultative linkage into an overall evaluation parameter EIx. In this case, firstly at least one first data set having economically relevant input parameters $F_m$ and at least one second data set having technically relevant input parameters $R_n$ are detected and/or established step-by-step. For each data set, the established input parameters are combined and/or linked into an economic evaluation parameter FIx and a technical evaluation parameter RIx using knowledge-based predetermined numerical and/or logical linkages as well as knowledge-based predetermined weighting factors specific to the equipment. Then, through knowledge-based predetermined numerical linkages and weighting factors, one single resulting overall evaluation parameter EIx is then determined from the evaluation parameters established.

To prepare for the method, specific input parameters $R_n$ may detected and/or determined selectively for each item of equipment and/or each type of equipment.

In this case, the predetermined input parameters $R_n$ take into consideration the risk and/or the probability of possible malfunctions and/or fault modes arising as well as possible faulty behavior of the particular equipment resulting therefrom, which, for example, in transformers and their functional components, particularly tap changers or on-load switches such as DETCs (deenergized tap changer) or OLTCs (on-load tap changer) and/or generators and/or electrical drives, may be caused by faulty mechanical windings, faulty electrical insulation systems, faulty cores, faulty contacts and/or contact points, faulty cooling systems, faulty electrical and/or mechanical bushings, and faulty drives and/or gears.

For each input parameter $R_n$ of the particular equipment used as a basis, at least one definition and/or value range which is relevant to the equipment may be determined. The definition and value ranges are to be determined in this case in such a way that a greater and/or higher value always corresponds to a high risk and/or a high probability for possible faulty behavior and/or a malfunction.

The technical input parameters $R_n$ to be detected or determined may not be specified in physical units in this case, but rather using a predetermined scaling specific for the particular equipment or on an arbitrary scale or definition range, for example, on a scale from 0 to 100, 1 to 5, or 20 to 80.

A computer program for execution on an appropriately set-up data processing device, which has the features of the method according to the present invention, results in a preferred embodiment of the system according to the present invention. A computer program, particularly a computer program stored on a data carrier, which has the features of the method according to the present invention, is therefore expressly included in the content of the disclosure of the present application.

The system for systematic evaluation and rating of technical equipment has at least one data processing device, which works together with at least one data memory, the data processing device containing means for detecting and/or establishing at least one first data set having economically relevant input parameters and at least one second data set having technically relevant input parameters for the particular technical equipment, and for each data set, using knowledge-based predetermined numerical and/or logical linkages as well as knowledge-based predetermined weighting factors specific to the equipment, for bringing together the input parameters established into an economic evaluation parameter FIx and a technical evaluation parameter RIx, and for determining one single resulting overall evaluation parameter EIx for validating the particular technical equipment from the established evaluation parameters using knowledge-based predetermined numerical linkages and weighting factors.

The system-oriented and systematically structured procedure according to the method is performed in this case, using a data processing device set up for this purpose in particular, by providing and using at least one demand-oriented pre-configured and/or graphically structured work interface and/or work environment, which allows efficient and practical classification of the investigated equipment to be evaluated into different quality classes. In this case, hierarchically constructed evaluation schemes are also advantageously usable.

These and further advantageous embodiments and designs of the present invention are the object of the description of the figures and the dependent claims.

The present invention and further advantageous embodiments will be explained and described in greater detail on the basis of several figures and exemplary embodiments.

Figure 2:
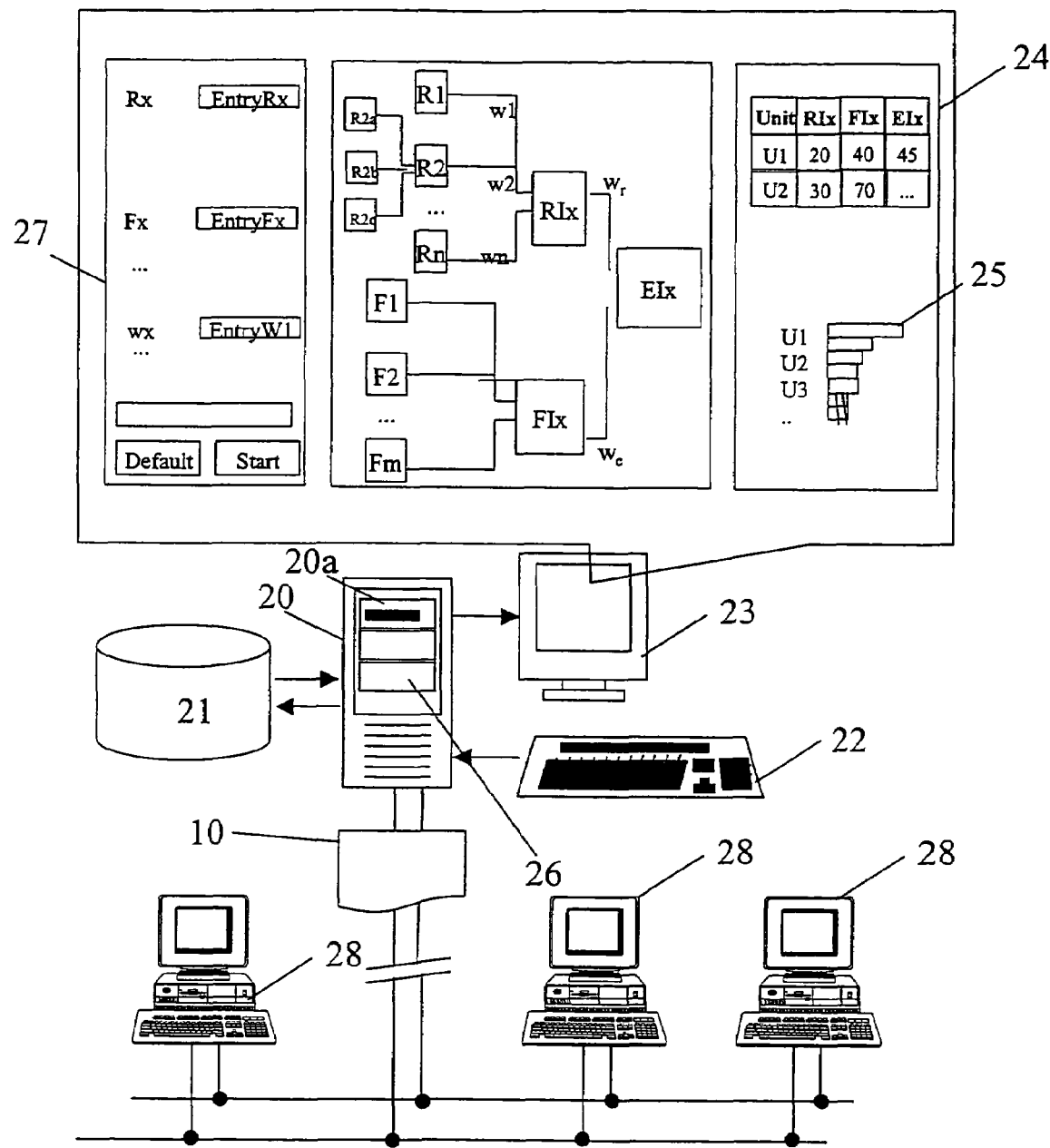
Figure 3:
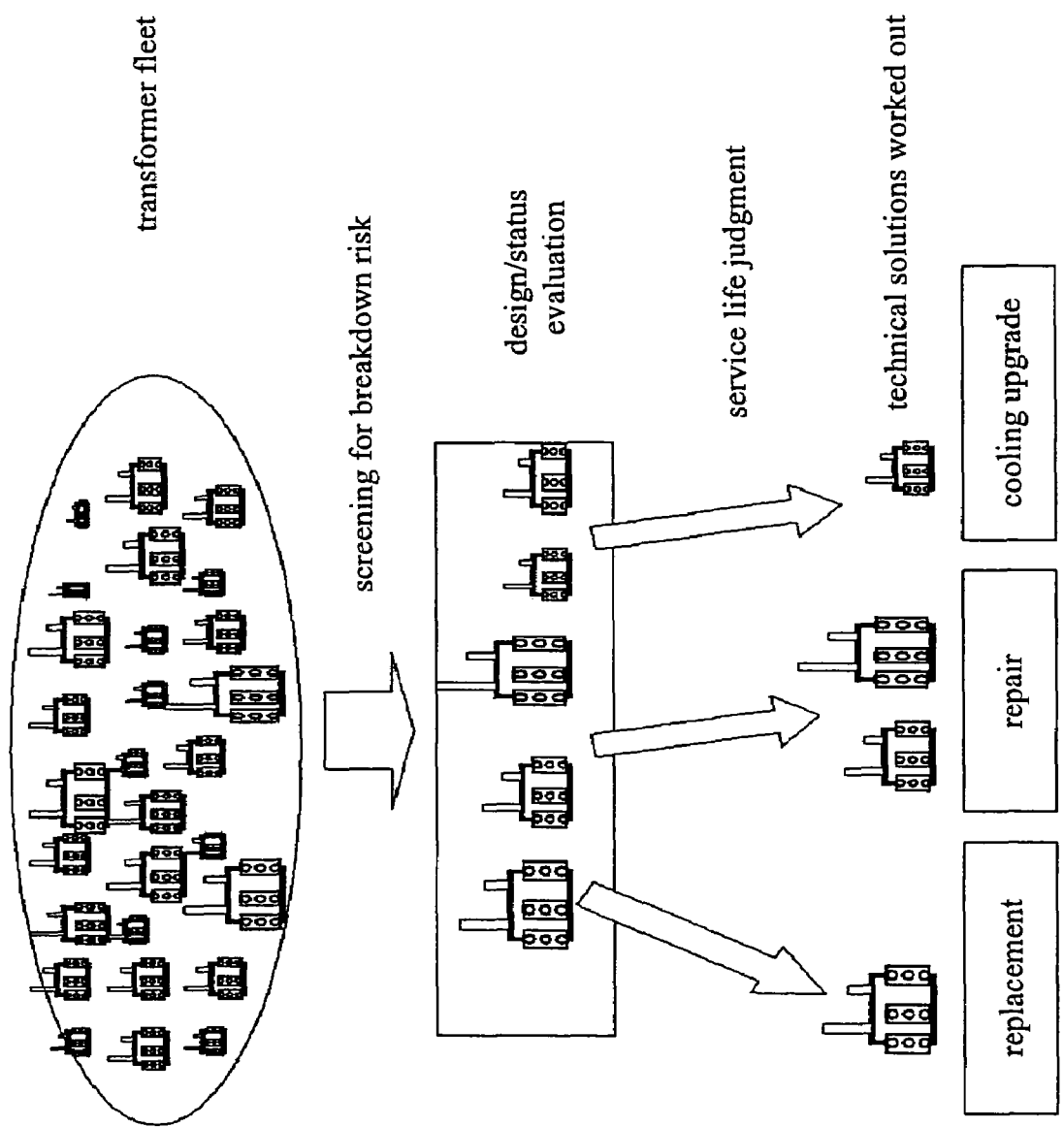
Figure 4:
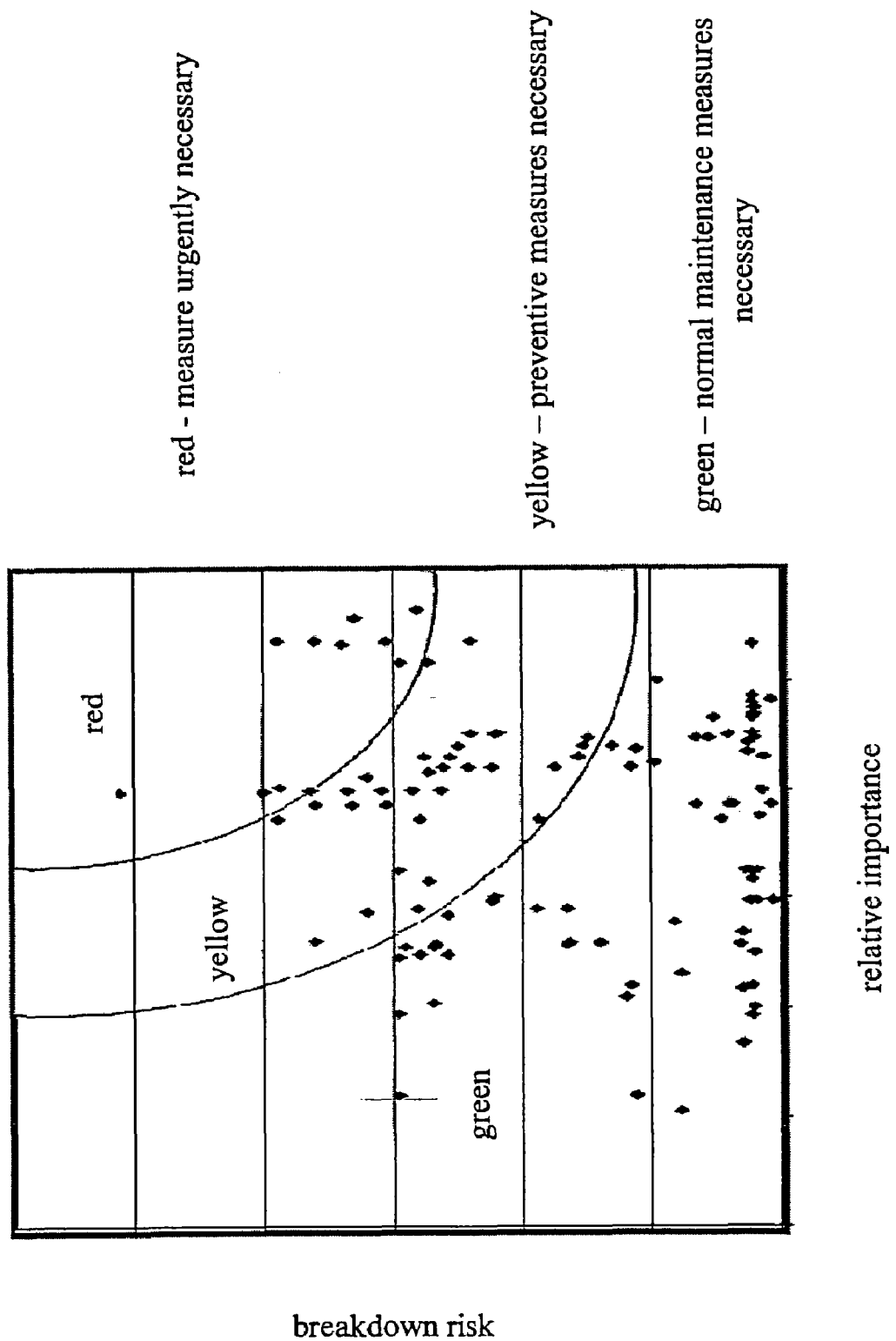
Figure 5:
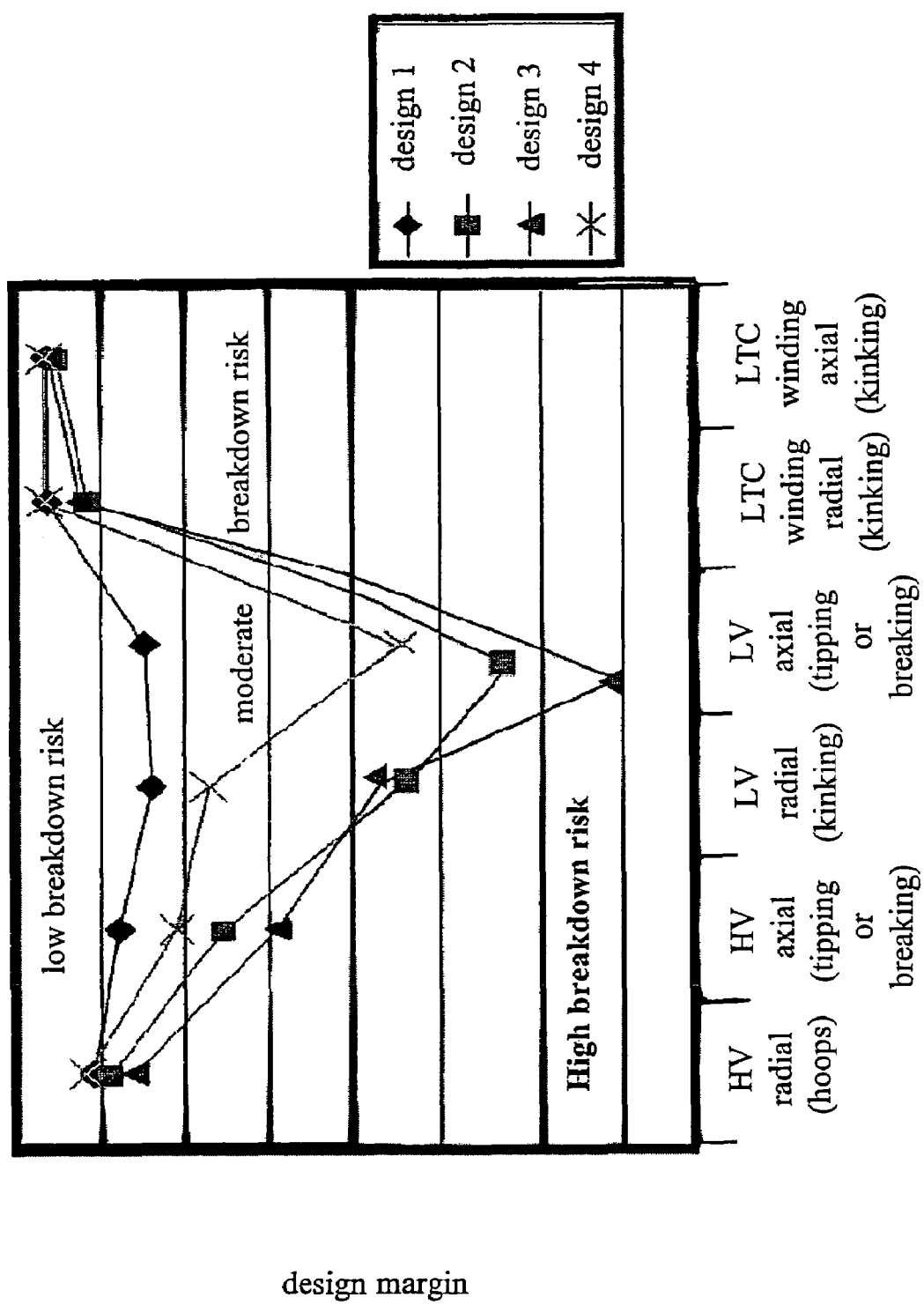
Figure 6:
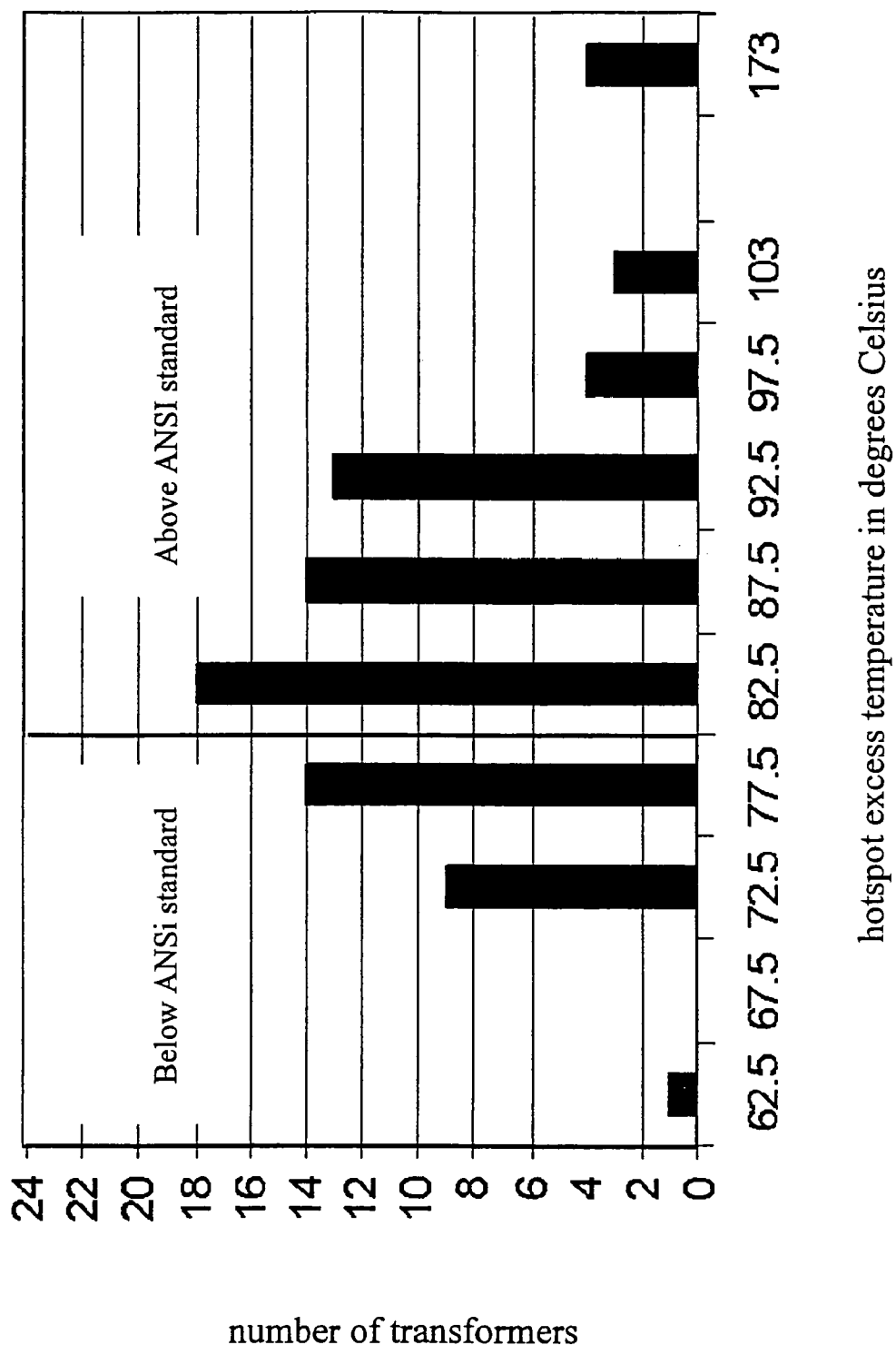
Figure 7:
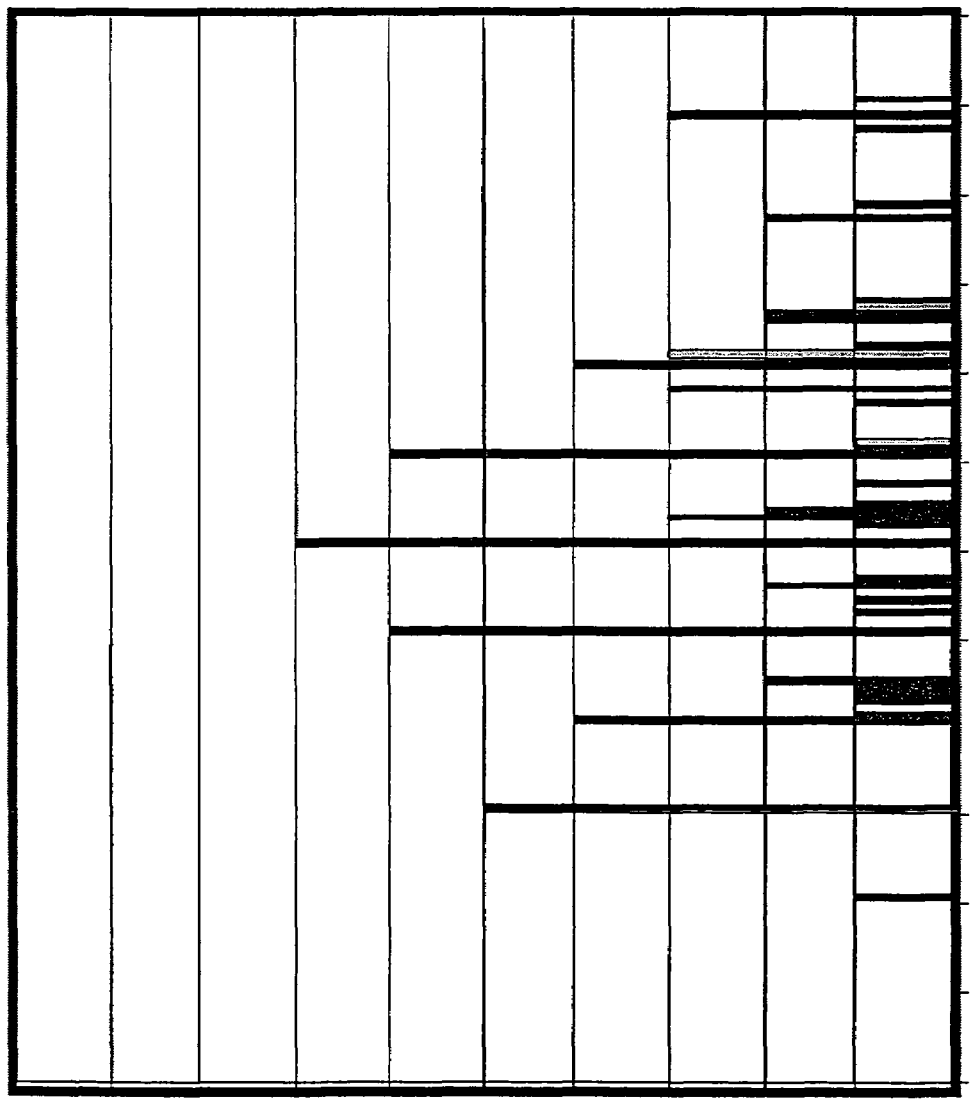
Figure 8:
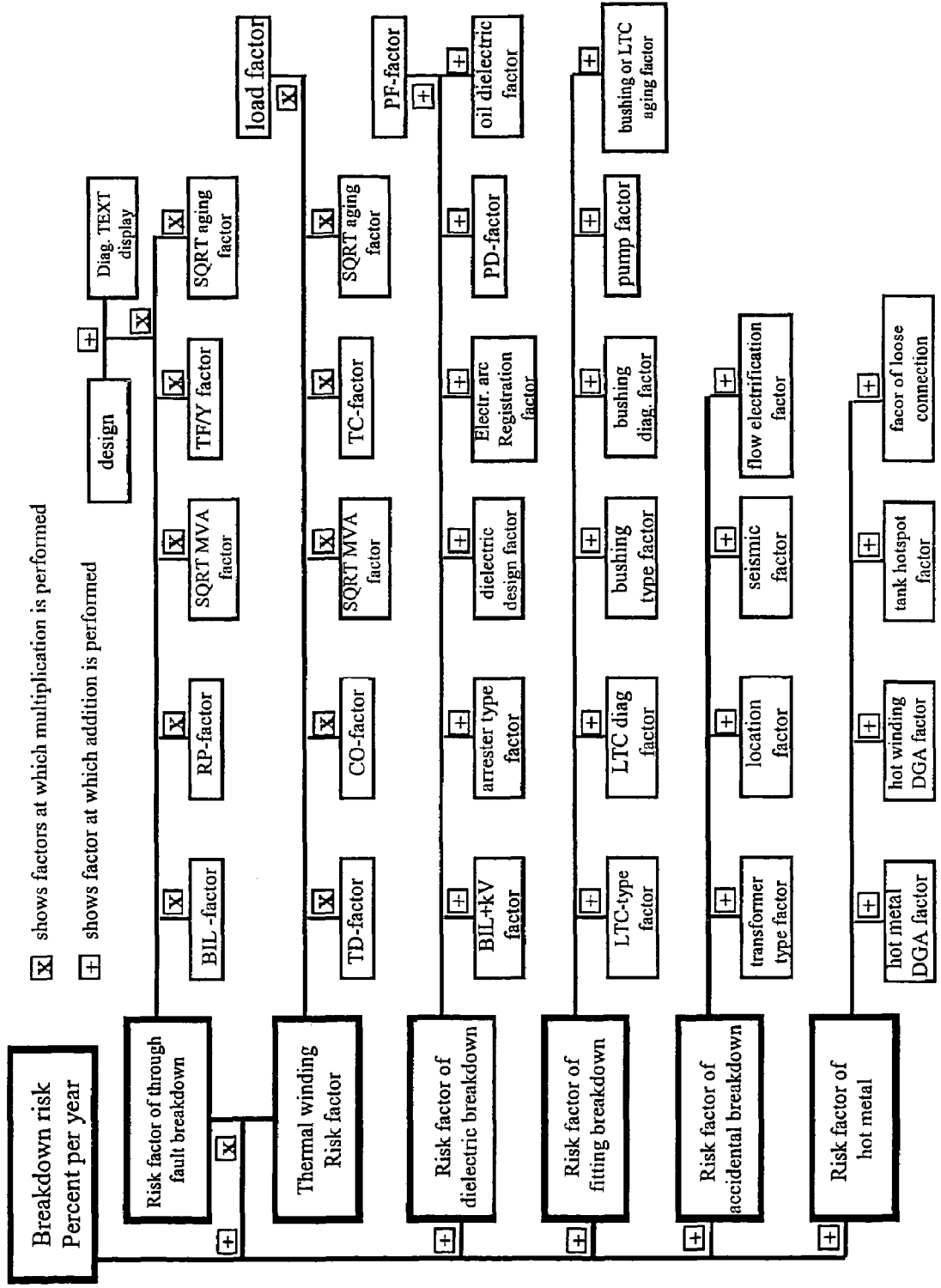
Figure 9:
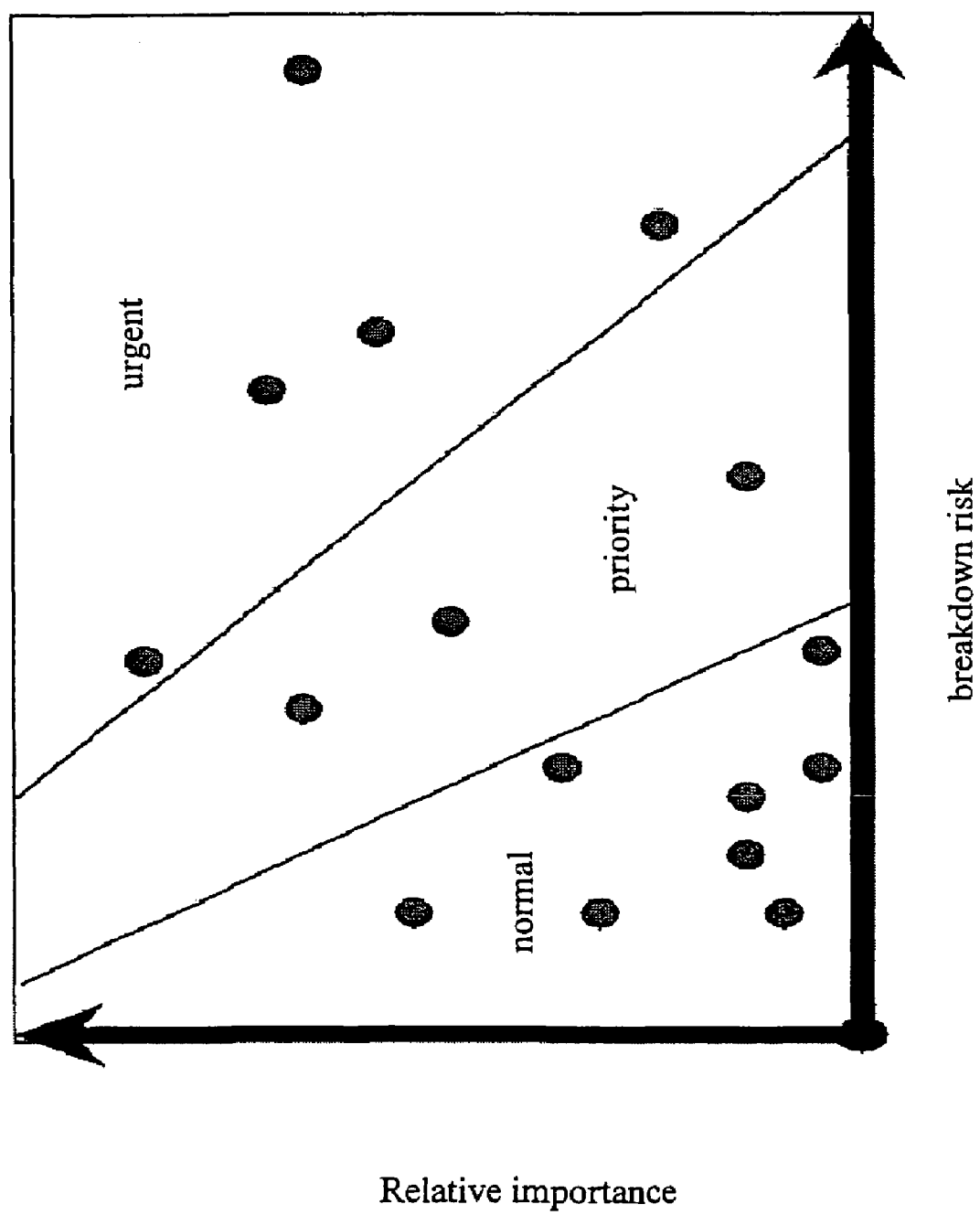
Figure 10:
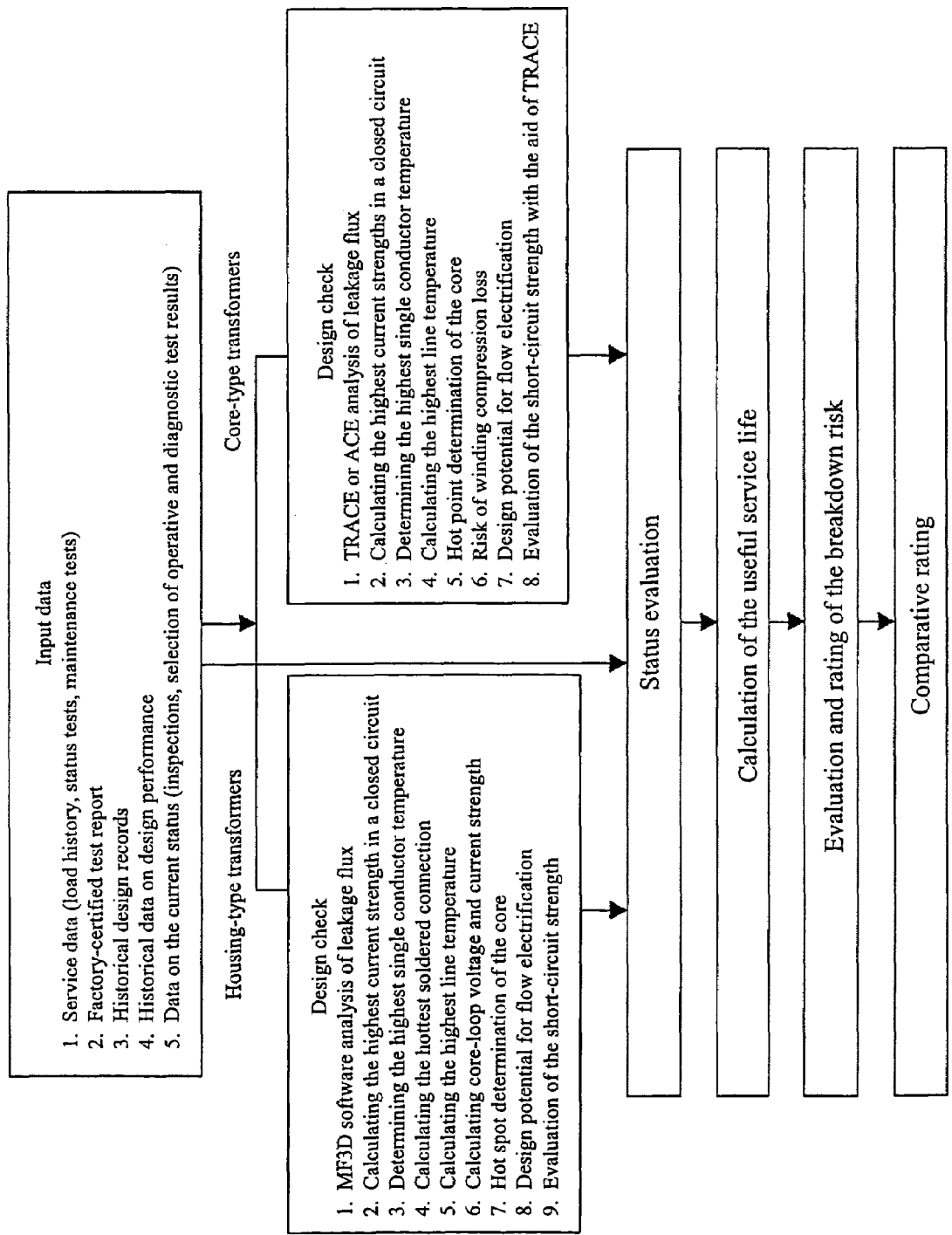

FIG. 1 shows an exemplary method sequence for the systematic evaluation and transmission of evaluation parameters of technical equipment, FIG. 2 shows an exemplary system for the systematic evaluation and transmission of evaluation parameters of technical equipment, FIG. 3 shows a flowchart of a method according to the present invention for transformer risk and service life judgment, FIG. 4 shows a graphic illustration of the results of the transformer fleet risk evaluation for a large transformer population in a power station, FIG. 5 shows results of the short-circuit strength design analysis in a service life study, FIG. 6 shows a transformer hot spot excess temperature for 80 different large network and machine transformers, FIG. 7 shows an example of the service life judgment/breakdown risk analysis for transformers at two different locations (different illustrations), compared to a large population of critical transformers, FIG. 8 shows a diagram in which an example of the process of the breakdown risk calculation is shown, FIG. 9 shows a diagram for determining the breakdown risk influence, and FIG. 10 shows a flowchart of the methods disclosed for service life profiling of power transformers.

FIG. 1 shows an exemplary method sequence for the systematic evaluation and transmission of evaluation parameters of technical equipment, in which, for the most complete and comprehensive possible equipment status evaluation, both a technical evaluation parameter RIx, relating to the technical status of the particular equipment, and an economic evaluation parameter FIx, relating to the economic significance of the particular technical equipment, are determined step-by-step. An overall resulting evaluation parameter EIx is produced by linking the two above-mentioned evaluation parameters.

For this purpose, at least one first data set having economically relevant input parameters $F_1 \ldots F_n$ and at least one second data set having technically relevant input parameters $R_1 \ldots R_n$ are first detected and/or established step-by-step for the particular technical equipment.

To determine the technical evaluation parameter RIx, firstly, in a first step 1R, input characteristics corresponding to the predetermined relevant input parameters $R_1 \ldots R_n$, such as estimations of the evaluator and/or user relating to the risk and/or the probability of a possible fault and/or breakdown, the quality, the capability, and/or the status of the particular technical equipment and/or one or more of its components, are detected and/or determined or assigned. The detection may be performed automatically in this case, in combination with appropriately configured databanks and/or evaluation tools, for example.

The input characteristics associated with the particular above-mentioned technical input parameters $R_1 \ldots R_n$ usually represent the best possible subjective estimation of the particular evaluator and/or user and are decisively based on his professional knowledge and/or experiences.

In addition, the above-mentioned technical input parameters $R_1 \ldots R_n$ may also, however, be output values of implemented upstream calculation and/or evaluation methods and/or tools, as shown in FIG. 1, which, for example, are obtained through a preprocessing VR of available technical equipment data and/or parameters $r_{11} \ldots r_{1i}, r_{21} \ldots r_{2i} \ldots r_{n1} \ldots r_{ni}$, particularly data of sensor and/or monitoring systems and/or diagnostic data, such as data relating to the load of a transformer and/or generator, oil fill levels and/or temperature, mechanically acting forces and/or gas formation. These values are then introduced into the method and/or transferred to the system as technical input data, if necessary using appropriately pre-configured interfaces for data detection and/or transmission, for example, via a local area network (LAN) and/or a world area network (WAN), particularly the Internet or a radio network, or as accessible on a data storage, preferably in a data bank or stored data set.

Manual detection of the different input variables $r_{11} \ldots r_{1i}, r_{21} \ldots r_{2i} \ldots r_{n1} \ldots r_{ni}$ and/or input parameters $R_1 \ldots R_n$ by the particular user is also possible.

The input parameters $R_1 \ldots R_n$, and accordingly their associated input characteristics, are weighted and/or scaled to determine the technical evaluation parameter RIx in a second step 2R using knowledge-based pre-determined, i.e., pre-determined based on empirical data and/or experiential values and/or technical considerations, individual technical weighting factors $wt_1 \ldots wt_n$, and resulting scaled intermediate variables $SR_1 \ldots SR_n$ are produced using associated scaled intermediate data.

Through the individual different weightings $wt_1 \ldots wt_n$ of the different input parameters $R_1 \ldots R_n$, among other things, the dangers and/or technical consequences associated with the particular fault mode of the technical equipment are taken into consideration, particularly if multiple equipments are coupled and/or operated in an interconnection.

The definition and/or value ranges of the particular input parameters $R_1 \ldots R_n$ are to be taken into consideration when the different technical weighting factors $wt_n$ are determined.

The scaled intermediate variables $SR_1 \ldots SR_n$ and the associated scaled intermediate data are linked and/or brought together automatically into the evaluation parameter RIx in a third step 3R as a function of preference using numerical and/or logical linkages 4R and further weighting factors $w_1 \ldots w_n$ specific to the equipment. The preference allocation and/or definition may be performed in this case, for example, on the part of the expert evaluator and/or user or device owner and/or knowledge-based, i.e., based on empirical data and/or experiential values as well as technical considerations. The preference allocation may advantageously be performed as a preparation for the method and/or during the running method. Preference changes are also possible in principle at any time.

The weighting factors $w_1 \ldots w_n$ specific to the equipment of the different scaled intermediate variables $SR_1 \ldots SR_n$ used for the preference allocation usually differ, but may in principle also have equal values.

The technical evaluation parameter RIx is determined on the basis of the scaled intermediate variables $SR_1 \ldots SR_n$, different logical/numerical linkage rules 4R being facultatively selectable as needed. The selection may be performed in this case as a preparation for the method and/or during the running method.

The determination of the technical evaluation parameter RIx from the scaled intermediate variables $SR_1 \ldots SR_n$ may be performed in this case, for example, by calculating a weighted sum using $RIx=(\Sigma(w_n * SR_n))*const$, a weighted product $RIx=(\Pi(SR_n^{w_{ni}}))*const$, or a freely designable numerical and/or logical linkage rule H of the general form $RIx=H(SR_1, SR_2, \ldots SR_n, w_1, w_2, \ldots w_n)$ using the weighting factors $w_1 \ldots w_n$.

Processing of fuzzy input parameters using fuzzy logic rules and/or methods and/or probabilistic methods is also advantageously possible.

A preprocessing preliminary stage, which, at least partially through interpolation and/or estimation methods, allows a value determination of the input parameters on the basis of multiple preliminary stage values, may advantageously be placed upstream for an objective estimation of the input parameters $R_1 \ldots R_n$.

Determination of the above-mentioned input parameters $R_1 \ldots R_n$ may generally be performed, as shown in FIG. 1, through at least one linkage rule $P_n$, which is empirically determined and/or follows technical considerations, generally expressible through $R_n=P_n(r_{n1}, r_{n2}, r_{n3} \ldots r_{ni})$, using the input variables $r_{1l} \ldots r_{1i}, r_{2l} \ldots r_{2i} \ldots r_{nl} \ldots r_{ni}$ and/or their associated technical equipment data and/or parameters.

Preferably, three processing values $r_{n1} \ldots r_{n3}$ are to be used in the pre-processing VR for each input parameter $R_1 \ldots R_n$ to be determined. These may relate, for example, to design and/or manufacture $r_{n1}$, aging $r_{n2}$, and observed and/or measured data $r_{n3}$ of the particular technical equipment to be evaluated. The number and type of the values taken into consideration in the preliminary stage and therefore the running index i may be freely selected and/or preset and are not limited. The number of values to be taken into consideration for determining the different input parameters $R_1 \ldots R_n$ may vary depending on the input parameter and/or from input parameter to input parameter.

A consistency check may advantageously be performed, which, for example, allows checking of the data inventory available to determine an input parameter $R_1 \ldots R_n$. If the existing data inventory is insufficient to determine the value of one or more input parameters $R_1 \ldots R_n$, the corresponding input parameter may be approximately facultatively determined on the basis of the existing data inventory or may be removed from the determination of the technical evaluation parameter RIx or may be specified manually.

A consistency check in regard to whether concrete values and/or data for the particular weighting factors and/or input parameters are specified and/or detected in principle, and whether the detected statements correspond to the predetermined definition and/or value ranges, may also be performed according to the method.

To determine the economic evaluation parameter FIx, which describes the economic significance of the technical equipment, in a further step 1F at least one second data set having economically relevant input parameters $F_1 \ldots F_m$ is determined. The input data of the economically relevant input parameters $F_1 \ldots F_m$ required for determining the economic evaluation parameter FIx of the particular technical equipment, particularly power engineering equipment, may be estimated in this case based on experiential values and/or technical/business considerations and/or determined using a further upstream preliminary stage processing VF, comparably to the technical input parameters $R_1 \ldots R_n$ for determining the technical evaluation parameter RIx.

The preliminary stage processing VF may be hierarchically configured in multiple levels in this case, so that a level and/or a set of input values for the pre-processing VF is usable for each economically relevant input parameter $F_1 \ldots F_m$.

An economically relevant and/or pecuniary input parameter $F_1 \ldots F_m$ may generally be produced in this case from numerical values $f_{11} \ldots f_{1q} f_{21} \ldots f_{2q} \ldots f_{m1} \ldots f_{mq}$, relating, for example, to acquisition costs, maintenance costs, profits obtained, transport costs, installation costs, costs per time unit in case of equipment breakdown, storage costs and/or acquisition costs for raw, auxiliary, and operating materials, costs caused by losses occurring in the equipment, recovery costs, costs for energy not provided, or any arbitrary combination of these or similar cost factors, through at least one numerical and/or logical linkage rule $G_m$ of the general formula $F_m=G_m(f_{m1}, f_{m2}, \ldots f_{mq})$, determined on the basis of empirical data and/or business/technical considerations, using the numerical values $f_{11} \ldots f_{1q} f_{2q} \ldots f_{2q} \ldots f_{m1} \ldots f_{mq}$.

Manual detection of the different input variables and/or input parameters by the particular user is also possible.

The level of the costs relevant for the parameter determination is essentially a function in this case of the particular technical equipment and/or its position and/or significance, particularly in the particular equipment interconnection. A first, approximate estimation of the values of the economic, particularly pecuniary input parameters $F_1 \ldots F_m$ may also be performed in this case by the evaluator and/or user.

The total costs TF established in a further step 2F from the pecuniary input parameters $F_1 \ldots F_m$ and/or their input characteristics through numerical linkages 3F are proportional to the economic evaluation parameter FIx. To determine the economic evaluation parameter FIx, the established total costs TF are scaled in a further step 4F on a predetermined scale and/or a predetermined value range, from 0–100, for example. The economic evaluation parameter FIx is specified accordingly. If necessary, the total costs TF may also be established by an upstream, separate processing tool and/or detected manually by the particular user.

Incorporating further weighting factors $w_r$ and $w_f$ and/or a linkage 6, in a further step 5, the technical evaluation parameter RIx and the economic evaluation parameter FIx are brought together and an overall evaluation parameter EIx is determined as a result.

The determination of the overall parameter EIx may be performed facultatively by determining the weighted Euclidean distance according to the linkage rule $$EIx = \sqrt{((w_r * RIx)^2 + (w_f * FIx)^2)},$$

$w_r$ and $w_f$ identifying the particular weightings of the technical evaluation parameter RIx and the economic parameter FIx. For the case in which the two above-mentioned weighting factors $w_r$ and $w_f$ correspond to the value one, i.e., $w_r = w_f = 1$, the Euclidean distance in 2-dimensional space results. A weighted sum of the economic evaluation parameter FIx and the technical evaluation parameter RIx, incorporating a factor k used for scaling, according to the linkage rule $$EIx = (w_r * RIx + w_f * FIx) * k,$$

may also be used as the facultative linkage rule for determining the overall evaluation parameter EIx. A determination of the weighted product of the economic evaluation parameter FIx and the technical evaluation parameter RIx according to the linkage rule $$EIx = (RIx^{wr} * FIx^{wf}) * l$$

is also facultatively possible as a further alternative linkage rule, the weightings and/or weighting factors $w_r$ and $w_f$ each being used as the exponent of the corresponding parameter. In this case as well, I again identifies a factor for scaling the overall evaluation parameter EIx.

In principle, any numerical and/or logical linkage rule Q of the general form EIx=Q(RIx,FIx) which may be arbitrarily preselected may be used for determining the overall evaluation parameter EIx.

The established parameters and/or the input variables and data upon which they are based are automatically displayed 7 in tabular and/or graphic form, for example, as a histogram or as a tree structure (cf. FIG. 2), and if necessary they are automatically stored 8 on a data memory and/or in a data bank.

The established parameters and/or input variables and their associated data are advantageously prepared in tabular form in a further step 9 and attached, via an interface specially set up for this purpose, which works together with the particular e-mail program or the particular e-mail client used, as an attachment 10 of an automatically prepared e-mail file provided according to the method with a unique identifier and retrievably stored on a data memory. The e-mail prepared in this way and the included data attachment 10 are accordingly transmittable by e-mail to one or arbitrarily many addresses worldwide in a simple way using a network and/or e-mail server connection.

In FIG. 2, an exemplary system for the systematic evaluation of evaluation parameters of technical equipment using a data processing device 20, which works together with a data memory 21 and has an input 22 and display device 23, is shown.

The system, particularly the data processing device 20, has means 20a for detecting and/or establishing at least one first data set having economically relevant input parameters $F_1 \ldots F_m$ and at least one second data set having technically relevant $R_1 \ldots R_m$ input parameters for the particular technical equipment to be evaluated. For each data set, the system automatically determines, on the basis of knowledge-based predetermined numerical and/or logical linkages and knowledge-based predetermined weighting factors specific to the equipment, both an economic evaluation parameter FIx and a technical evaluation parameter RIx. One single overall evaluation parameter EIx is determined by the system resulting from the established evaluation parameters through knowledge-based predetermined numerical linkages 6 (cf. FIG. 1) and weighting factors. The established parameters and/or the input variables and data upon which they are based are displayed by the system in tabular form 24 and/or graphic form, as a histogram 25 or a tree structure, for example, and are provided retrievably and possibly stored retrievably on a data memory 21 and/or in a data bank.

The system advantageously has an interface 26, which is set up for the purpose of working together with a typical e-mail program or e-mail client and preparing the established parameters and/or input variables and their associated data in tabular form and attaching them as an attachment 10 to an automatically prepared e-mail file provided with a unique identifier and storing the e-mail file retrievably on a data memory 21, for example, and/or transmitting it to one or more addresses and/or further data processing devices 28. For this purpose, the identifier may contain specific information about the particular evaluated equipment, data information, or information relating to the author and/or the time of day.

The system provides an evaluation mask, using which the data of the different input variables and/or input parameters is selectively detected and shown in graphic form. For better understanding, a schematic method scheme 28 used as the basis is shown.

To predetermine weighting factors and/or preferences and/or input variables to be used for parameter determination and/or linkage rules, for example, appropriate input 27 and/or selection masks having optionally selectable selection possibilities are provided by the system.

Equipment data and/or equipment status data previously stored in a data bank may also be used by the system in combination with a data bank to evaluate technical equipment. This is particularly true for default values which are stored in the data bank and are typical for a specific type of equipment.

In order to give an example of the method according to the present invention and/or the system according to the present invention for systematic evaluation and rating of technical equipment, an example of the development of such a method for transformers is to be specified in the following.

The risk/service life judgment of transformers has been the subject of much attention in recent years, because of the aging transformer fleet in industry and the failure of important assets because of transformer breakdowns. A decade of application and development of service life judgment and risk management technology for large power transformers has resulted in a unit-based method having the following components:

Screening the breakdown risk of large transformer populations to identify critical assets.

Detailed design evaluation of the critical transformers using current design practices and tools. These include the current hotspot temperatures and the actual service life loss, the short-circuit strength and the risk of future breakdowns in connection with known design problems (flow electrification, winding kinks, partial discharge, circular currents, core heating, etc.).

Status evaluation using the results of routine and advanced diagnostics and correlation with the design evaluation.

Service life judgment (profiling) incorporating all critical aspects having effects on the transformer output.

Recommending the most attractive option for service life extension.

In the following, the evaluation and application of this process will be described for a number of different segments of the transformer population of power suppliers. A good approach is based on being tailored to the special transformer population and the transformers used in application. The examples shown confirm the great importance of design analysis and the experience of the manufacturer with the special design for an accurate service life judgment. The application of these important technologies shows how future-oriented supply firms prepare for an uncertain future.

A service life judgment method according to the present invention has its beginnings in the need to become better acquainted with the diagnosis and judgment of the status of different transformers. Detailed historical knowledge of the transformer design of nearly 75% of the installed large assets in North America is available as the basic data. In addition, there is the knowledge of repair shops, in which numerous broken transformers have been seen and which have decades-long experience in the forensic analysis of transformer components.

The service life judgment is an important sector of transformer diagnostics. This service life judgment approach was focused on the capability or the ability of individual transformers in the network to produce the desired output. The transformers were individually analyzed, in an evaluation based on fuzzy logic, for technical (design data, diagnosis test data, etc.) and non-technical (application, importance, replacement transformers, etc.) aspects. The net result resulted in a ranked list of the different transformers for identifying the most critical transformers for follow-up maintenance and repair work or, in the extreme case, replacement.

Service life judgments were performed for the following reasons:
(1) reliability considerations in regard to older assets;
(2) planning of replacement and repair;
(3) service life extension/increase of the power capacity;
(4) improved maintenance, and
(5) better asset usage.

The results of the service life judgments of the large number of transformers—for example, those which have been identified in the fleet risk evaluation process—are generally used in the course of an RCM program (reliability centered asset management) in order to be able to order resource allocations by priority. If small groups or only single transformers participate, the service life judgment is understood as a part of the decision process for service life extension, repair, or replacement.

The majority of the service life judgments actually performed occur in regard to machine transformers, which may be attributed to the value and the breakdown costs of these important assets. As in any technology in development, the detail and complexity of the analysis has increased in the course of time and with the experience obtained. The requirements of the generation firms have also changed with the development of the new generation of power companies. Instead of the traditional power companies having a mixture of power generation, transmission, and distributor assets, there are currently large power firms which have a mixture of power generation assets in different parts of the country. The power generation assets are no longer connected to the traditional suppliers and the service organizations of the original owners. The new power firms have a mixture of diverse transformers which are scattered over the country. In the majority of cases, the personnel having responsibility for asset management do not have the necessary historical knowledge of the transformers or their status. In consideration of an aging population of transformers (average age ~33 years) with unknown life expectancies, the firms have been searching for a solid technical basis for asset planning decisions.

The answer was a three-stage process, including:
(1) risk evaluation of the transformer fleet,
(2) rigorous, unit-based design evaluation including status judgment, and
(3) detailed service life judgment-including design/engineering analysis of the means for service life extension of each specific transformer (see FIG. 3.).

Checking the Transformer Fleet

The fleet risk evaluation method is the first step and/or a precursor step in the service life management process. The method is used for the purpose of exploring the easily available analytical data and statistical information about each transformer of the fleet, so that precise and intelligent measure plans in regard to the future of individual transformers and the entire fleet may be prepared. The goal is the ordering by priority of measure plans for the transformers and the fleet and the identification of those transformers which are candidates for more detailed design, status, and service life judgments.

This analysis includes both the calculation of the breakdown risk of the individual transformers and an evaluation of the relative importance of the individual transformers. The calculation of the breakdown risk was developed on the basis of a statistical analysis of transformer breakdown data as a function of a number of transformer power and design parameters and known generic design weak points in regard to older design generations. This data was collected using historical records about specific transformers and published data about breakdown statistics. The relative importance of a transformer takes the economic effects of an operational breakdown of the relevant asset into consideration. The importance may be established in different ways. One possible approach, however, contains parameters such as the replacement costs of the transformer, the lost sales connected with a failure, and the availability losses occurring in case of breakdown, as well as relative cost breakdowns and time problems. The parameters of such an evaluation are typically established by a team which is composed of technicians from the user and the transformer manufacturer. After the breakdown risk and the relative importance of each individual transformer in the fleet have been established, a combined measure graphic is prepared, as is illustrated in FIG. 4, for example. This example relates to a large transformer fleet in a power generation system and includes all transformers in the individual power plants.

Design and Status Evaluation of Transformers

The design evaluation and status evaluation method for transformers is a significant step for the service life judgment and the asset management of transformers. It is a very technical procedure and requires the most modern, rigorous analysis methods and rules, which are currently typical for design, test, and quality assurance tools used by design engineers in the design and manufacture of core-type and housing-type transformers.

The method approach for the service life judgment is based on units and designs. This means that the methods and analysis tools focus on the individual transformer, the type, the type of use, the application, and the needs of the supplier and/or operator. However, the approach is also status-based, i.e., it contains different diagnostic and historical measurement data of the transformer status. The status-based data is analyzed in awareness of the individual design and the type, so that known generic or endemic characteristics may be identified and categorized. The status evaluation is also performed with reference to the results of the detailed design study.

Detailed Design Evaluation

The design or engineering analysis of older transformers is a very important part of the service life judgment. After the performance of service life judgments or design studies on hundreds of different transformers having numerous different design forms, it is clear that the specified rated values of a transformer do not necessarily correspond to its actual capacities or power limits in practice.

Transformer design engineers did not have the same instruments available in the past as they do today. Often, slide rule calculations and general diagrams or rules were used instead of the well thought-out, computer-based design programs which are typical today. The practices, rules, and limits of designs were also significantly improved in the course of time and/or reintroduced with increased knowledge and experience. In addition, since the time of the design of a transformer, transformer problems typical to the time were often recognized and the design practices were subsequently changed in such a way that these problems could be corrected. As a result, a design/engineering analysis reveals a lot about the transformer—why it has functioned in such a way, how it has functioned, and which changes may be necessary for performance improvement or a load increase or for other applications. Although, for example, the current standard requirements limit the hotspot excess temperatures to 80° C., the design analyses of older transformers have shown that the actual calculated hotspot temperatures on 15 to 40-year-old transformers lie anywhere between 60° C. and over 170° C. (FIG. 6). Only in few cases does the hotspot measuring device indicate the correct hotspot temperature. We may state that they typically lie slightly above the average winding temperature. In consideration of this uncertainty, it is nearly impossible to determine the actual loss of service life or the load and/or overload capacity of an older transformer without a design study. It does appear advisable to react with additional cooling in such cases, but this may also bring risks with it or not appear economically advisable in relation to the advantage achieved. Transformers having pumps may have oil flow-through rates which are already over the design limits, because of which the addition of further cooling could lead to failure because of flow electrification.

This is also true for the mechanical design of older transformers. While some older embodiments are very robust and capable of surviving the gravest fault conditions in the power system, others are in turn subject to significant restrictions in managing serious circumstances, since less precise calculations and limits of the short-circuit strength were used in the design of these transformers. An analysis of these older designs is of great value for determining the risk of future operation and the need for replacement parts. A further example of the currently available new calculation methods, which were not available a few years ago, is the calculations of winding circular current and core current in core-type and housing-type transformers. 3-D calculations currently offer new, valuable information about the design and a significantly higher precision of the design evaluation of older design types, particularly of housing-type transformers.

The detailed design evaluation of the transformer for the service life judgment makes use of the newest design programs and design practices of the transformer manufacturers. These include, for each design:

1. An evaluation of the electrical and thermal output of the transformer, including:
   a) ohmic and eddy current losses of the winding, circular current/losses, overall winding loss density distribution, and the actual localized hotspot temperature,
   b) calculation of the core loss density distribution and core hotspot temperature, and
   c) strength of the core currents,
   d) sufficient magnetic or power shielding to prevent local tank or support structure heating over acceptable limiting values,
   e) calculation of dielectric loads and strengths in the windings and in the connector and conductor structure.
2. An evaluation of the mechanical design to determine whether the transformer is susceptible to short-circuit breakdowns because of system errors. During the performance of the mechanical design check, the internal loads in the winding and in the insulation and metal support structure are determined, for which calculated maximum asymmetric short-circuit forces in the windings as a result of all types of fault on the high-voltage (HV) or low-voltage side (LV) are used. These load values are then compared to the calculated strengths of the windings (down to the individual conductor level) and the support structure.
3. A design evaluation of other known causes of breakdowns or field problems typical for other transformers of the same type.

FIG. 5 shows the results of the mechanical design study for typical group of older transformers, illustrating the results of the short-circuit design study.

This type of information is extremely useful for clarifying the field history of the transformers and for asset management (replacement parts usage, identification of critical units, etc.).

Status Evaluation

The purpose of status evaluation is the evaluation of the probable status of the internal and external parts of the transformer. The internal evaluation includes the insulation system (paper, pressboard, oil, etc.), the core, mechanical support structures, and internal auxiliary devices such as tap changers and auxiliary transformers or reactors. The external asset includes the tank, the cooling system, the controllers, oil conservation systems, bushings, and integrated protective systems. The evaluation combines inputs from the design evaluation with historical load and operational data as well as routine and advanced diagnostic data.

An important part of the status evaluation is the evaluation of the winding insulation and the estimated remaining service life of the paper insulation. The study uses historical transformer load data with a thermal simulation of the transformer windings and the cooling system. Using these inputs, the cumulative effect of the transformer hotspot temperatures on the paper insulation may be evaluated. The key to the approach according to the present invention is the design analysis for determining the hotspot excess temperature for the transformer. FIG. 6 shows a statistical diagram of the hotspot excess temperature at rated MVA for 80 different network transformers and power plant transformers (machine transformers, auxiliary units, etc.), which were produced between 1960 and 1992. Even if these transformers were designed while observing the 80 degree limit, the design analysis using our modern design tools shows that seventy percent of the transformers have an actual hotspot excess temperature which is above the current ANSI limiting value of 80° C. Actually, in all 70% of the cases over the 80 degree limit and in some of the 30 cases under the limit, the actual hotspot excess temperature is higher than the value indicated on the hotspot excess temperature display device of the transformer windings.

Without this design analysis, it would be impossible to evaluate the load on the transformer or estimate the service life loss of the insulation. This is because a 7° C. excess temperature in the assumed hotspot temperature means doubling of the prognosticated insulation aging.

A further interesting observation for the transformer population in FIG. 6 is the fact that, in spite of a hotspot excess temperature well over the ANSI limiting value in many transformers, only a few of the 80 transformers have a loss of insulation service life of more than 100%. This was to be attributed to the fact that most of these transformers were never loaded to the specified maximum rated value.

The status evaluation typically also includes an on-location inspection and an evaluation of the historical (routine) diagnostic data and maintenance information and the advanced diagnostic measurements. This routine diagnostic data includes a DGA (analysis of dissolved combustible gas in the oil) and an oil chemistry analysis, as well as electrical test data including the results of winding and bushing power factor tests. For this purpose, specialized diagnostic test analysis tools were developed for evaluating DGA and oil quality results.

Advanced diagnostic tests also play an important role in the status evaluation. The DFR test (dielectric frequency response) was developed into an important tool for status diagnosis of the insulation system. This test was used for the purpose of identifying the exact moisture content in the cellulose insulation in order to support decisions in regard to field drying requirements and to provide inputs for the evaluation of the insulation service life. In addition, new advances in the DFR methodology were used for the purpose of identifying specific problems in the transformer, including metal particle contaminations, contaminations with corrosive sulfur, carbon cracking, and high-ohmic core-grounding connections. Other advanced diagnostic tests, including the furan analysis of the oil, FRA (frequency response analysis), and partial discharge analysis, are also used as needed for specific cases.

Service Life Judgment/Profiling

The design analysis often clarifies the pattern of diagnostic data (DGA, electrical test results, etc.) and helps in the identification of important fields in which changes may be undertaken to extend the transformer life. These could include modifications of the cooling system (pump or cooler upgrades, etc.) or modifications of fittings (oil conservation system, bushings, controllers, etc.). In addition, the study provides an estimation of the remaining service life of the transformers, so that the user may plan for future investment needs.

A further object of the service life judgment is a ranked rating by units, in which the breakdown risk is described on the basis of results of the design and status evaluation. This is a more detailed and precise breakdown risk judgment than in a fleet risk evaluation, especially since it is based on the specific knowledge of the transformer design and the actual status and additionally uses the statistical and historical parameters in connection with the fleet risk evaluation. The resulting rating provides a precise evaluation of the breakdown risk of the transformer, which may be compared to the expected breakdown risk of other transformers in the industry.

A typical example of the results of a service life judgment profiling is shown in FIG. 7, which includes a comparison to a population of other critical transformers in industry. We understand critical transformer populations as transformers like those in the red or yellow zone of FIG. 4. On the basis of this profiling, the supplier may make service life management decisions which are based on the relative breakdown risk for the transformers and the comparison with other critical units in the industry. If the risk is higher than the average of the critical population, it is clear that immediate measures must be taken to prevent inappropriate breakdowns or service losses.

In order to manage specific problems which were recognized in the service life judgment study, or if significant changes in the load or application of the transformer have been considered, engineering-based solutions are necessary. After the performance of service life judgments or design studies on hundreds of different transformers having multiple different designs, it is clear that the rated values alone do not necessarily correspond to the actual capacities or restrictions of the transformers in operation. For this reason, a design-tailored solution is necessary in order to be able to give adequate recommendations for service life extensions or other changes in the service situations. In addition, the effects of aging processes on the transformers (according to the insights of the status evaluation) may restrict the future use of the transformer or potential upgrades.

The advantages of the multiphase transformer risk/service life judgment process and how this process had developed from a rating method into a design and unit-based method, in which the specific knowledge of the transformer design, in combination with advanced diagnostic methods and experience-based status evaluations, are in the foreground, were described above. The access to data on thousands of transformer designs and the implementation of the newest computer-based design programs are, among other things, decisive for this improved process. The value of these methods for the user has been shown and provided the user numerous and above all economically important foundations for asset management decisions in the application of these technologies to hundreds of older transformers in the North American and worldwide power systems. Without the advantage of this status evaluation on the basis of design knowledge, erroneous estimations of remaining transformer lifetimes or breakdown risks could occur. With increasing average age of the transformers, this approach will only become more important and more critical.

On FIG. 8 in Detail:

BIL factor means: transformers having a BIL (basic insulation level) below the normal design level have a higher breakdown risk because of the shorter insulation path.

RP factor means: the RP or "reclosing practice" relates to the practice of the asset of reclosing power switches which supply the transformers in the case in which the feed line turns off. Since reclosing may cause an asymmetrical through fault current in a fault status, this practice increases the breakdown risk. If multiple auto-reclosing is practiced, this additionally increases the breakdown risk because the transformer is subjected to further through faults.

SQRT MVA factor means: this factor is the square root of the MVA factor. The MVA factor is the output of an algorithm which was developed in order to relate the average breakdown risk to the size or the MVA of the transformer. This algorithm was developed on the basis of historical records of transformer breakdowns, which also took the MVA of the transformer into consideration.

TF/Y factor means: the number of significant through faults which the transformer experiences per year. We understand a significant through fault as one that produces a current to the transformer which corresponds to more than four times the peak rated current of the transformer. If there is no data available or if the number of through faults per year is less than 2.5, a malfunction value of 2.5 is set.

SQRT aging factor means: this is the square root of the aging factor. We understand the aging factor as the average breakdown probability of transformers of the same type as described in the technical paper "Replacement and refurbishment strategies for transformer populations" by Bengtsson, Persson und Svenson.

Design factor means: this factor identifies the relative risk of a mechanical movement or warp in the windings because of a short-circuit at the transformer terminal, based on the special design. This factor is fixed through expert opinion with reference to the special transformer and may include the knowledge of the specific design.

Diag. test display means: this factor is based on results of the frequency response analysis test (FRA) or on power factor capacitance tests. If either the FRA or the power factor capacitance tests show a significant deviation from base values (in the case of capacitance, more than 1% change in a recognizable pattern), the transformer receives a diagnostic registration of a risk for mechanical movement of the windings because of through fault currents.

TD factor means: this identifies the thermal design factor and is based on the knowledge of the design and evidence that the specific design is susceptible to unusual hotspots in the windings and may be subject to the risk of thermal worsening of the paper insulation in the windings.

CO factor means: since the thermal decomposition of the cellulose insulation in the winding causes CO and $CO_2$ gas, unusually high quantities of these gases is an indication of a risk of excessive aging and brittleness in the paper, through which a higher breakdown risk could arise.

TC factor means: the TC (=type of the expansion tank) influences the relative risk of thermally caused disintegration. A constant oil conservation system helps to limit the quantities of moisture and oxygen in the oil and the reduction of the risk of thermal disintegration connected therewith. A system having a nitrogen blanket has less risk than a sealed system, because the risk of oxygen and moisture penetrating into the transformer is lowered.

Load factor means: the load factor relates the risk of thermal decomposition to the load of the transformer. Transformers having higher loads typically have higher winding temperatures and display stronger aging of the insulation.

BIL+kV factor means: this factor relates the design BIL and the rated HV–kV level to the relative breakdown risk. The factor is based on historical data about transformer breakdowns in which BIL and kV were known.

Arrester type factor means: older transformers having the original SiC arresters with spark gaps may experience higher overvoltages than transformers having newer ZnO arresters; therefore, they have a higher risk of dielectric breakdowns.

Dielectric design factor means: transformers having a known flaw in the dielectric design—generally those with sister units in which dielectric field breakdowns have occurred—have a higher risk of a dielectric breakdown.

Electric arc registration factor means: transformers having abnormally high acetylene values from the DGA results are subject to a risk of electric arc formation in the transformer, which may lead to breakdowns.

PD factor means: transformers in which the DGA indicates a PD (partial discharge) (typically based on hydrogen gas), have a breakdown risk.

Oil dielectric factor means: transformers having oil which has test results lying outside the recommended limiting value for service-aged oils have a higher risk of a dielectric breakdown.

PF factor means: transformers in which the most recent power factor dielectric test results lie outside the recommended range (generally 0.5%) have a risk of dielectric breakdown.

LTC type factor means: specific types of load tap changers (LTC) are subject to a higher breakdown risk than others. Generally, electric arc tap changers have a higher risk than interrupter switches.

LTC diag. factor means: if the DGA results show evidence of abnormal arc formation or unusually high temperatures in the contacts (because of the ratio of hot metal gas to hydrogen and acetylene), there is a breakdown risk for the tap changers.

Bushing type factor means: specific bushing types (e.g., the U-bushing of the GE type) have historically shown a greater breakdown risk than other bushing types.

Bushing diag. factor means: bushings having a higher power factor or those whose power factor has significantly increased have a breakdown risk.

Pump breakdown means: ball bearing pumps typically have a higher risk of causing a breakdown of the main transformer by releasing metal into the transformer than ring bearing pumps.

Bushing or LTC aging factor means: load tap changers (LTCs) or bushings with an age of more than 20 years have a significantly higher breakdown risk than newer LTCs or bushings.

Transformer type factor means: specific transformer types, including furnace transformers, phase shifter transformers, and industry transformers, have generally displayed a higher breakdown rate than other types of transformers.

Location factor means: transformers located on the East Coast, West Coast, or in the densely populated regions of the South typically have a higher breakdown risk because of different factors, such as more short-circuits, higher fault currents, and higher switching activity (particularly switching of capacitors).

Seismic factor means: transformers in regions having a higher earthquake risk are subject to a higher breakdown risk because of winding movement or damage to bushings or other fittings in case of an earthquake.

Flow electrification factor means: specific transformer types which were produced in specific periods of time have a higher breakdown frequency because of flow electrification.

Hot metal DGA factor means: transformers having high contents of a specific combustible gas have a risk of hot metal in the transformer. This may not cause a breakdown of the transformer, but it could require the necessity of taking the transformer off-line for extraordinary maintenance or for oil degassing.

Hot winding DGA factor means: transformers whose DGA results indicate the probability of hot windings (typically a combination of hot metal gases and carbon oxide gases) may have the risk of operational loss because of the necessity of internal inspection or repair.

Tank hotspot factor means: transformers having high tank hotspot temperatures, which are generally determined through infrared thermography, are subject to the risk of worsening of the oil or problems with the shielding of the internal tank wall; they may bring about an operational loss risk because the oil must be processed or the shielding must be repaired.

Factor loose connection means: transformers which generate combustible gas (hot metal gas, CO and $CO_2$) under light load conditions have a risk of loose crimp or screw connections or faulty soldered connections. The transformer may have a risk of operational loss to correct the fault.

On the basis of the breakdown risk calculation and the relative importance of the transformer for the asset, a diagram such as FIG. 9 is prepared, in which each transformer in the fleet is shown as a point on the curve. The scaling factor in the curve is tailored in such a way that the most important transformers are placed near the top of the diagram. The breakdown risk scale is tailored in such a way that approximately 10% of the transformers are located in the red zone (preferred). Using this scaling, it is possible that some of the transformers are outside the diagram; however, this is not unusual.

The categorization of the transformers in the fleet using the method of FIG. 9 results in both a priority for the work on the transformers and the reasons for the high breakdown risk impact. We understand breakdown risk impact as the combination of the importance for the system with the breakdown risk. Transformers which are in the red priority zone generally require immediate attention in order to decide on possibilities for reducing the breakdown risk impact. The risk may be lowered either by reducing the breakdown risk (for example, using repair or detailed investigation to clarify a problem) or by reducing the importance (by adding a replacement to the substation or by moving a transformer to a less important location).

In the following, an example of a method for service life profiling of power transformers is to be specified.

The attached flowchart shown in FIG. 10 illustrates the method according to the present invention in an embodiment, using which precise service life profiling of power transformers may be performed.

Step 1: Input Data

The input data are very important for step 2: design check and step 3: status evaluation. For the design evaluation (step 2), the following data must be available: original historic design records from the archives and the statistical data on design performance. For the status evaluation (step 3), the following input data is important: outputs of the last (modern) design program (step 2) and load histories, test results, maintenance information, test report with factory certificate, historical and current status information of inspections, operations, and routine and advanced diagnostics.

Step 2: Design Check

The detailed design evaluation of the transformer uses the newest design programs and practices.

For housing-type transformers these include:
1. MF3D software analysis of leakage flux
2. Calculating the highest current strength in a closed circuit
3. Determining the highest single-conductor temperature
4. Calculating the hottest soldered connection
5. Calculating the highest line temperature
6. Calculating core-loop voltage and current strength
7. Hot spot determination of the core
8. Design potential for flow electrification
9. Evaluation of the short-circuit strength For core-type transformers, these include:
1. TRACE or ACE analysis of leakage flux.
2. Calculating the highest current strengths in a closed circuit
3. Determining the highest single-conductor temperature
4. Calculating the highest line temperature
5. Hot point determination of the core
6. Risk of winding compression loss
8. Design potential for flow electrification
9. Evaluation of the short-circuit strength with the aid of TRACE Step 3: Status Evaluation The purpose of the status evaluation is the evaluation of the probable status of the internal and external transformer parts. The internal evaluation includes the insulation system (paper, pressboard, oil, etc.), the core, mechanical support structures and internal auxiliary apparatus, such as tap changers and auxiliary transformers or reactors. The external system includes the tank, the cooling system, the controllers, oil conservation systems, bushings, and integrated protective systems. The evaluation combines inputs from the design evaluation with historical load and operational data as well as routine and advanced diagnostics. Advanced diagnostics also play a significant role in the status evaluation. The DFR test (dielectric frequency response) was refined into an important instrument for diagnosis of the insulation system status. This test was used for the purpose of identifying the exact moisture values in cellulose insulation in order to support a decision finding in regard to user-specific drying limits and obtain inputs for the evaluation of the insulation service life. In addition, new advances in the DFR method have been used for the purpose of identifying specific problems in the transformer, including metal particle contaminations, contaminations with corrosive sulfur, carbon cracking, and high-ohmic core-grounding connections. Other advanced diagnostic tests, such as a furan analysis of the oil, FRA (frequency response analysis), and partial discharge analysis are also performed as needed for special cases.

Step 4: Calculation of the Useful Service Life

An important part of the service life profiling method is the evaluation of the winding insulation and the estimated remaining life of the paper insulation. The study uses historic transformer load data and a thermal simulation of the transformer winding and cooling system. Using these inputs, the cumulative effect of the transformer hotspot temperatures on the paper insulation is evaluated.

Step 5: Evaluation and Rating of the Breakdown Risk

A further output of the service life profiling is a rating by units which describes the breakdown risk on the basis of the results of the design check, the status evaluation, and the life usage calculation. This is a very detailed and precise breakdown risk evaluation, since, besides statistical and historical parameters, it focuses on the specific knowledge of the transformer design and its current status. The resulting rating provides a precise judgment of the breakdown risk for the transformer which may be compared to the expected breakdown risk of other transformers in the industry.

What is claimed is:

1. A method for systematic evaluation and rating of technical equipment using a data processing device, which works together with at at least one data memory and has an input and display device, the method comprising:
   at least one first data set having economically relevant input parameters and at least one second data set having technically relevant input parameters are detected and/or established for the particular technical equipment, for each data set, through knowledge-based predetermined numerical and/or logical linkages and knowledge-based predetermined weighting factors specific to the equipment, the established input parameters are brought together into an economic evaluation parameter FIx and a technical evaluation parameter RIx, respectively, and from the established evaluation parameters, through knowledge-based predetermined numerical linkages and weighting factors, a single overall resulting evaluation parameter EIx for validating the particular technical equipment is determined, storing at least one of the established evaluation parameters and the single overall resulting evaluation parameter EIx in the at least one data memory, and displaying related information of at least one of the established evaluation parameters and the single overall resulting evaluation parameter EIx.

2. The method according to claim 1, wherein the input characteristics associated with the input parameters are output values of calculation and/or equipment evaluation tools, which are obtained through preprocessing of available input variables, particularly technical equipment data and/or parameters and/or measurement data.

3. The method according to claim 1, wherein, on the basis of the technically relevant input parameters, possible malfunctions and/or possible faulty behavior of the particular equipment, particularly faulty mechanical windings, faulty electrical insulation systems, faulty course, faulty contacts and/or contact points, faulty cooling systems, faulty electrical and/or mechanical bushings, and drives and/or gears occurring in transformers and/or their functional components, such as tap changers or load transfer switches, particularly deenergized tap changers or on-load tap changers, and/or generators and/or electrical drives, may be taken into consideration.

4. The method according to claim 1, wherein it is used for the systematic status evaluation of power engineering equipment, particularly transformers.

5. The method according to claim 1, wherein the determination of the technical evaluation parameter RIx from scaled intermediate variables SRn is performed by calculating a weighted sum using $$RIx=(\Sigma(w_n * SR_n)) * const$$

or a weighted product $$RIx=(\Pi(SR_n^{Wn})) * const$$

or a freely designable numerical and/or logical linkage rule H of the general formula $$RIx=H(SR_1, SR_2, \ldots SR_n, w_1, w_2, \ldots w_n)$$

using the weighting factors $w_n$, wherein $SR_1, SR_2, \ldots SR_n$ are the scaled intermediate variables: $w_1, w_2, \ldots w_n$ are weighting factors; const is a numerical value; and H designates the freely designable numerical and/or logical linkage rule.

6. The method according to claim 1, wherein the determination of the economic evaluation parameter FIx from pecuniary input parameters $F_m$ is performed using numerical linkages, particularly additive linkages, and appropriate scaling.

7. The method according to claim 1, wherein the determination of the overall parameter EIx is performed facultatively by determining the weighted Euclidean distance according to the linkage rule $$EIx=\sqrt{((w_r * RIx)^2+(w_f * FIx)^2)},$$

or by determining the weighted sum of the economic evaluation parameter FIx and the technical evaluation parameter F while incorporating a factor k used for scaling, according to the linkage rule $$EIx=(W_r * RIx+wf * FIx) * k$$

or according to the linkage rule $$EIx=(RIx^{wr} * FIx^{wf}) * I,$$

I identifying a factor for scaling of the overall evaluation parameter EIx and $w_r$ and $w_f$ identifying the particular weightings of the technical evaluation parameter RIx and the economic parameter FIx.

8. The method according to claim 1, wherein the established parameters and/or input variables and their associated data are prepared in tabular form and, via an interface set up for this purpose, which works together with an e-mail program and/or e-mail client, are attached to an automatically prepared e-mail file as an attachment and/or stored retrievably on a data memory.

9. The method according to claim 8, wherein the prepared and stored e-mail and the attached data attachment are transmitted using at least one network and/or e-mail server connection to one or arbitrarily many assignable addresses.

10. The method according to claim 8, wherein the automatically prepared e-mail is provided with a unique identifier for better retrievability.

11. The method according to claim 8, wherein the automatic preparation of the e-mail with the attachment is performed cyclically, at predetermined intervals in time and/or upon each method end.

12. The method according to claim 1, wherein equipment data and/or equipment status data previously stored in the databank, particularly default values for a specific type of equipment, is used for evaluation of technical equipment.

13. A system for systematic evaluation and rating of technical equipment, which has at least one data processing device, which works together with at least one data memory and has an input and display device, wherein the data processing device has means for detecting and/or establishing at least one first data set having economically relevant input parameters and at least one second data set having technically relevant input parameters for the particular technical equipment, for each data set, through knowledge-based predetermined numerical and/or logical linkages and knowledge-based predetermined weighting factors specific to the equipment, bringing together the established input parameters into an economic evaluation parameter FIx and a technical evaluation parameter RIx respectively, and from the established evaluation parameters, using knowledge-based predetermined numerical linkages and weighting factors, determining a single overall resulting evaluation parameter EIx for validating the particular technical equipment, storing at least one of the established evaluation parameters and the single overall resulting evaluation parameter EIx in the at least one data memory, and displaying related information of at least one of the established evaluation parameters and the single overall resulting evaluation parameter EIx.

14. The system according to claim 13, wherein means are provided for obtaining and/or determining the input characteristics associated with the input parameters through preprocessing of available input variables, particularly technical equipment data and/or parameters and/or measurement data.

15. The system according to claim 13, wherein it works together with calculation and/or equipment evaluation tools to obtain the input characteristics associated with the input parameters through preprocessing of available input variables, particularly technical equipment data and/or parameters and/or measurement data.

16. The system according to claim 13, wherein, using the technically relevant input parameters, possible malfunctions and/or possible faulty behavior of the particular equipment, particularly faulty mechanical windings, faulty electrical insulation systems, faulty course, faulty contacts and/or contact points, faulty cooling systems, faulty electrical and/or mechanical bushings, and drives and/or gears occurring in transformers and/or their functional components such as tap changers or load transfer switches, particularly deenergized tap changers or on-load tap changers, and/or generators and/or electrical drives, are taken into consideration.

17. The system according to claim 13, wherein it is usable for the systematic status evaluation of power engineering equipment, particularly transformers.

18. The system according to claim 13, wherein, for determining the technical evaluation parameter RIx from the scaled intermediate variables SRn, a weighted sum, using $$RIx=(\Sigma(w_n*SR_n))*const$$

or a weighted product $$RIx=(\Pi(SR_n^{Wn}))*const$$

or a freely designable numerical and/or logical linkage rule H of the general formula $$RIx=H(SR_1, SR_2, \ldots SR_n, w_1, w_2, \ldots w_n)$$

using the weighting factors $w_n$, wherein $SR_1, SR_2, \ldots SR_n$ are the scaled intermediate variables: $w_1, w_2, \ldots w_n$ are weighting factors: const is a numerical value; and H designates the freely designable numerical and/or logical linkage rule.

19. The system according to claim 13, wherein that numerical linkages, par additive linkages, and appropriate scaling are used for determining the economic evaluation parameter FIx from pecuniary input parameters $f_m$.

20. The system according to claim 13, wherein for determining the overall parameter EIx facultatively, the weighted Euclidean distance according to the linkage rule $EIx=\sqrt{((w_r*RIx)^2+(w_f*FIx)^2)}$, or the weighted sum of the economic evaluation parameter FIx and the technical evaluation parameter RIx incorporating a factor k used for scaling, according to the linkage rule $$EIx=(W_r*RIx+wf*FIx)*k$$

or according to the linkage rule $$EIx=(RIx^{wr}*FIx^{wf})*I,$$

is used, I identifying a factor for scaling of the overall evaluation parameter EIx and $w_r$ and $w_f$ identifying the particular weightings of the technical evaluation parameter RIx and the economic parameter FIx.

21. The system according to claim 13, wherein tabular preparation of the established parameters and/or input variables and their associated data is provided.

22. The system according to claim 13, wherein an interface is provided which works together with at least one e-mail program and/or one e-mail client.

23. The system according to claim 21, wherein parameters and/or input variables prepared in tabular form and their associated data are attached as an attachment to an automatically prepared e-mail file and/or retrievably stored on a data memory.

24. The system according to claim 23, wherein at least one network and/or e-mail server connection is provided, using which the prepared and stored e-mail and the attached data attachment may be transmitted to one or arbitrarily many assignable addresses.

25. The system according to claim 23, wherein the automatically prepared e-mail is provided with a unique identifier to ensure better retrievability.

26. The system according to claim 13, wherein an evaluation mask is provided, using which the data of the different input variables and/or input parameters may be detected selectively and displayed in graphic form.

27. The system according to claim 13, wherein appropriate input and/or selection masks having optionally selectable selection possibilities are provided for predetermining weighting factors and/or preferences and/or for detecting input variables and/or linkage rules to be used for the parameter determination.

* * * * *